United States Patent
Lee et al.

(10) Patent No.: US 8,045,921 B2
(45) Date of Patent: Oct. 25, 2011

(54) AUDIO DELIVERY SYSTEM AND METHOD FOR MOBILE PHONE

(75) Inventors: Kyong Hun Lee, Chungcheongbuk-do (KR); Kyung Hwan Ahn, Daegu Metropolitan (KR); Yong Ju Kim, Gumi-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 762 days.

(21) Appl. No.: 11/903,578

(22) Filed: Sep. 24, 2007

(65) Prior Publication Data

US 2008/0090524 A1    Apr. 17, 2008

(30) Foreign Application Priority Data

Oct. 11, 2006  (KR) .................. 10-2006-0099063

(51) Int. Cl.
   *H04B 7/00*   (2006.01)
(52) U.S. Cl. ....... 455/41.2; 455/512; 455/513; 455/436; 455/39
(58) Field of Classification Search .................. 455/41.1, 455/41.2, 41.3, 567, 569.1, 569.2, 557, 66.1
See application file for complete search history.

(56) References Cited

U.S. PATENT DOCUMENTS

| | | | |
|---|---|---|---|
| 6,968,153 B1* | 11/2005 | Heinonen et al. | 455/11.1 |
| 7,366,534 B2* | 4/2008 | Hong | 455/509 |
| 7,558,529 B2* | 7/2009 | Seshadri et al. | 455/41.2 |
| 2002/0045454 A1* | 4/2002 | Iwata | 455/450 |
| 2004/0048569 A1* | 3/2004 | Kawamura | 455/41.1 |
| 2004/0198358 A1* | 10/2004 | Kim et al. | 455/436 |
| 2005/0020207 A1* | 1/2005 | Hamada et al. | 455/41.2 |
| 2005/0125222 A1* | 6/2005 | Brown et al. | 704/200.1 |
| 2006/0205349 A1* | 9/2006 | Passier et al. | 455/41.2 |

FOREIGN PATENT DOCUMENTS

| | | |
|---|---|---|
| JP | 2002-223288 | 8/2002 |
| KR | 2001-53675 | 7/2001 |
| KR | 2002-44277 | 6/2002 |
| KR | 2005-38885 | 4/2005 |
| KR | 2006-74238 | 7/2006 |

* cited by examiner

*Primary Examiner* — Edward Urban
*Assistant Examiner* — Ganiyu Hanidu
(74) *Attorney, Agent, or Firm* — Cha & Reiter, LLC (57) ABSTRACT

A wireless audio delivery system and method are disclosed for distributing an audio signal to a plurality of headsets through short range wireless communication channels. An audio delivery method for a short range wireless communication network including a master device and a plurality of slave devices includes selecting, at the master device, one of the slave devices as a primary slave device, assigning a master control to the primary slave device, establishing a communication channel between the master and the slave devices and delivering audio data to the slave devices through the communication channel.

16 Claims, 8 Drawing Sheets

FIG. 7B ically embodiments of the present invention;

AUDIO DELIVERY SYSTEM AND METHOD FOR MOBILE PHONE

CLAIM OF PRIORITY

This application claims the benefit of the earlier filing date, pursuant to 35 USC 119, to that patent application entitled "AUDIO DELIVERY SYSTEM AND METHOD FOR MOBILE PHONE," filed in the Korean Intellectual Property Office on Oct. 11, 2006 and assigned Serial No. 2006-0099063, the contents of which are incorporated herein by reference.

BACKGROUND OF THE INVENTION

1. Field of the Invention

The present invention relates to a mobile phone and, in particular to a wireless audio delivery system and method for a mobile phone that enable distribution of an audio signal to multiple headsets through short range wireless communication channels.

2. Description of the Related Art

A mobile phone is one of the most quickly developing electronic devices, backed up by its portability and convenience. Recently released mobile phones support various multimedia functions such as Moving Picture Experts Group Layer-3 (MP3), Digital Multimedia Broadcasting (DMB), motion picture playback, camera, and data management functions, for example.

Typically, multimedia content contains audio data, which is or output through a speaker of the mobile phone. However, speaker output may be noisy to other people and even intrude on the privacy of others. For this reason, earphones or headsets have been used to prevent other people from hearing the sound either for privacy or to prevent disturbance.

Sometimes it is required to share the sound output from an audio source with specific people. In this case the other people may listen to the sound using a pair of earpieces separately or interconnect a dual output jack for enabling two earphones to listen to the output. However, the earpiece and output jack sharing methods limit the number of listeners and restrict movements of the listeners since the earphones and headsets are connected through relatively short cords, whereby it is difficult to share listening sound output from the single source.

SUMMARY OF THE INVENTION

The present invention has been made to provide a wireless audio delivery system and method that are capable of distributing audio data from a source device to multiple transducers.

In accordance with an aspect of the present invention, an audio delivery method for a short range wireless communication network includes a master device and a plurality of slave devices. The audio delivery method includes selecting, at the master device, one of the slave devices as a primary slave device, assigning a master control to the primary slave device, establishing a communication channel between the master and the slave devices, and delivering audio data to the slave devices through the communication channel.

In accordance with another aspect of the present invention the audio delivery system includes a plurality of slave devices for receiving identical audio data and outputting the audio data as audible sound waves, and a master device for establishing communication channels to the slave devices and delivering the audio data to the slave devices through the communication channels.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Certain terms are used in the following description for convenience and reference only and are not to be considering limiting. In the following detailed description, only exemplary embodiments of the invention has been shown and described, by way of illustration of the best mode contemplated by the inventor of carrying out the invention. As will be realized by those skilled in the art, the invention is capable of modification in various obvious respects without departing from the principles or scope of the invention. Accordingly, the drawings and description are to be regarded as illustrative in nature and not restrictive.

In the present invention, well-known Bluetooth technology is adapted for implementing an audio delivery system and method. However, the present invention can be implemented with any short range wireless communication technology.

In the present invention, a Bluetooth chip, for example, is used for representing a short range wireless communication module, however other short range wireless communication modules such as ZigBee, Ultra Wide Band (UWB), Infrared Data Association (IrDA) chips may be used.

Although a headset is used for an audio transducer in the present invention, other types of audio transducers such as a headphone, ear set, and speaker that are capable of converting electrical signals from a media play devices into audible sound waves may be used.

The audio delivery system and method of the present invention is described in association with a mobile phone. However, the present invention is not limited to the mobile phone, but can be adapted to portable devices such as a digital broadcasting receiver, Personal Digital Assistant (PDA), and Smartphone. Also, the mobile phone can be 3rd generation terminal, Code Division Multiple Access (CDMA) terminal, Global System for Mobile communication (GSM) terminal, Wireless Local Area Network (WLAN) terminal, Wireless Broadband (WiBro) terminal, and High Speed Downlink Packet Access (HSDPA) terminal.

Figure 1:
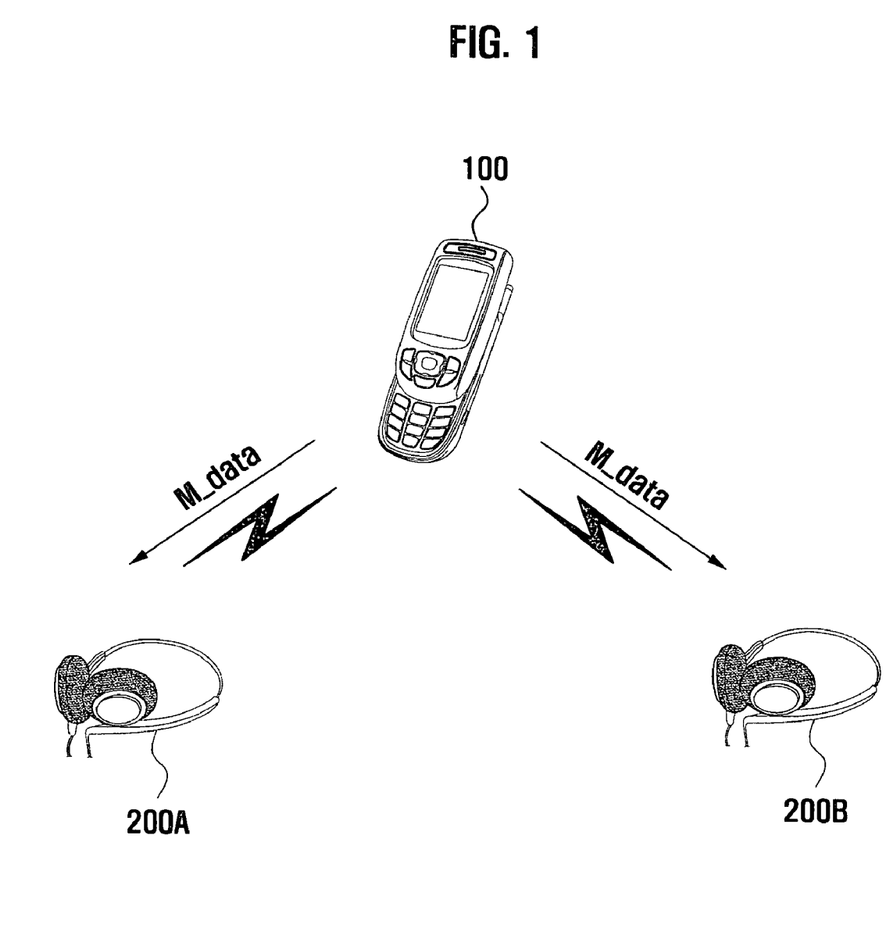
FIG. 1 is a schematic view illustrating an audio delivery system according to an embodiment of the present invention.

FIG. 1 is a schematic view illustrating an audio delivery system according to an exemplary embodiment of the present invention.

Referring to FIG. 1, the audio delivery system includes a mobile phone 100 and headsets 200A and 200B. The mobile phone 100 transmits audio data (M_data) to the primary and secondary headsets 200A and 200B and the headsets 200A and 200B convert the audio data into audible sound at the same time. For example, when an MP3 or radio function of the mobile phone 100 is activated, two people can listen to the MP3 or radio at the same time.

Figure 2:
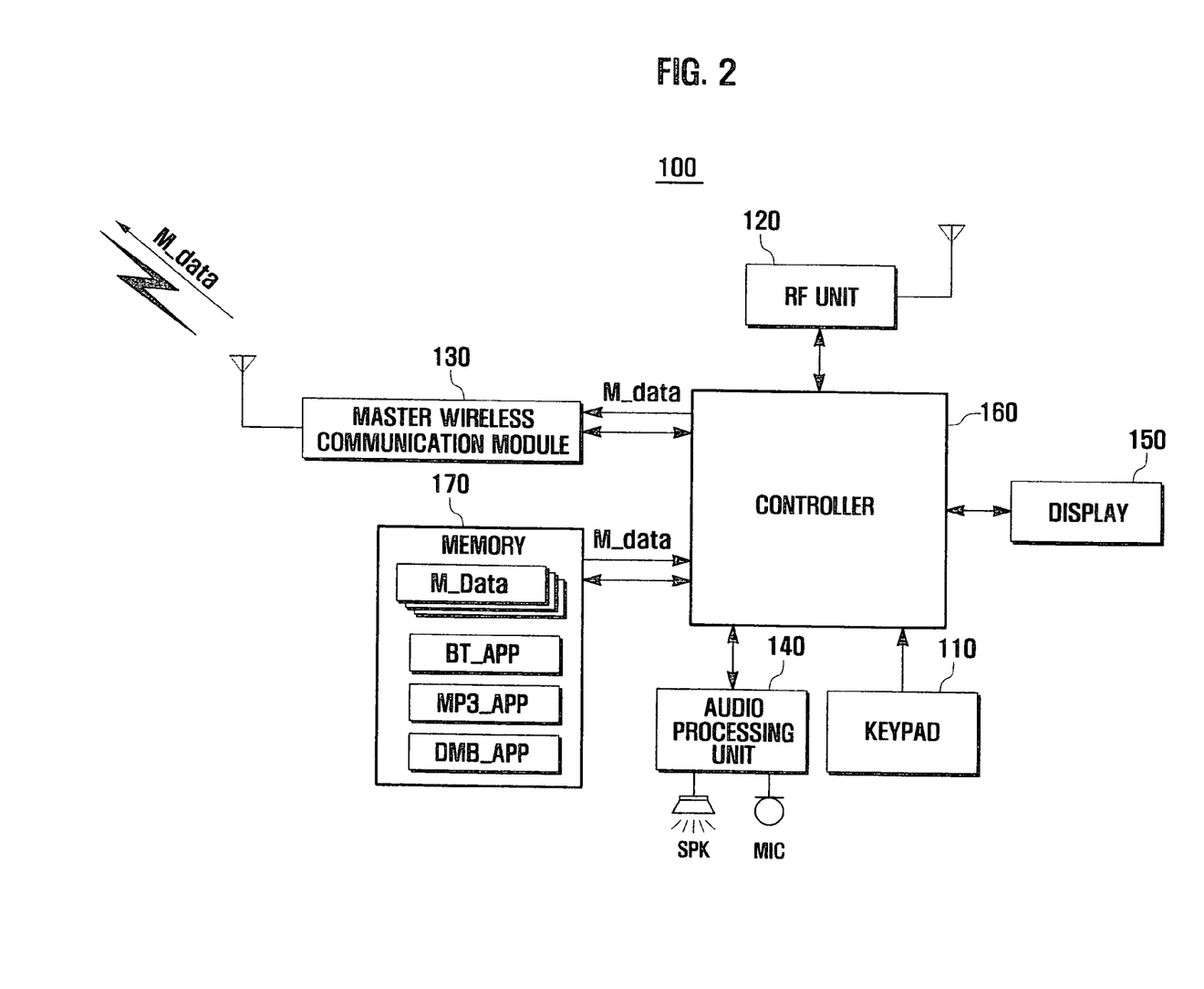
FIG. 2 is a block diagram illustrating a configuration of the mobile phone of the audio delivery system of FIG. 1.

FIG. 2 is a block diagram illustrating a configuration of the mobile phone of the audio delivery system in FIG. 1.

Referring to FIG. 2, the mobile phone 100 includes a master wireless communication module 130, a memory 170, a key input device, for example, a first keypad 110, a display 150, a first audio processing unit 140, a Radio Frequency (RF) unit 120, and a controller 160.

The master wireless communication module 130 can be implemented with 10 any short range wireless communication technology such as Bluetooth, ZigBee, UWB, and IrDA. In this exemplary embodiment, Bluetooth wireless technology is adopted for the master wireless communication module 130.

Bluetooth operates in the unlicensed Industrial Scientific Medical (ISM) band at 2.4 Gigahertz using 79 channels between 2.402 GHz to 2.480 GHz (23 channels in some countries). The range for Bluetooth communication is up to 10 meters with a power consumption of 0 dBm (1 mW). This distance can be increased to 100 meters by amplifying the power to 20 dBm. The Bluetooth radio system is optimized for mobility. Bluetooth operates with very low power, as little as 0.3 mA in a standby mode and 30 mA during sustained data transmissions. Bluetooth uses a fast frequency hopping spread spectrum (FHSS) technique for avoiding interference. With 78, 1 MHz channels, Bluetooth provides a lower guard band of 2 MHz and an upper guard band of 3.5 MHz.

Bluetooth is classified into three classes by transmission power: class 1 up to 100 mW, class 2 up to 2.4 mW, and class 3 up to 1 mW. Also Bluetooth uses Gaussian Frequency Shift Keying (GFSK) and supports 3 SCO channels with A-Law, u-Law PCM, and Continuous Variable Slope Delta Modulation (CVSD). The frequency hopping for avoiding interference between the master wireless communication module 130 and the primary and secondary headsets 200A and 200B will be described with reference to FIG. 3.

The memory 170 stores an audio delivery application for transmitting audio signals from the mobile phone 100 to the headsets 200A and 200B, which may be a Bluetooth application (BT_App), MP3 application (MP3_App), DMB application (DMB_App), etc. The memory 170 includes a program region and a data region.

The program region stores an operating system (OS) for controlling overall operation of the mobile phone 100, application programs for playing various multimedia contents, and other functionality application programs related to a camera function, audio playback function, and still image and motion picture playback function. These functions are activated by executing applications in accordance with a user command under the control of the controller 160.

The data region is a space for storing application data generated by the applications such as audio and video files. The audio files are the audio data (M_data) transmitted from the mobile phone 100 to the primary and secondary headsets 200A and 200B.

The first keypad 110 is provided with a plurality of alphanumeric keys for inputting data and function keys executing various functions. The function keys may include navigation keys and shortcut keys. Some of the function keys can be positioned on a different side of the mobile terminal 100 from the first keypad 110. The first keypad 110 delivers key signal input for setting and controlling functions to the controller 160.

Particularly, the first keypad 110 is implemented for delivering key signals related to the audio delivery system of the present invention to the controller 160.

The mobile phone 100 provides a menu for delivering the audio signals through multiple wireless channels such that a user may generate a signal for executing a multichannel audio delivery function by manipulating keys while the menu is presented on a display screen.

The display 150 presents various menu screens of the mobile phone 100 and information input by the user or notifying the user.

Particularly, the display 150 is implemented so as to display a menu interface for presenting multichannel audio delivery-related options and connection status of the primary and secondary headsets 200A and 200B. The display 150 presents an MP3 function screen after connection between the master wireless communication module 130 of the mobile phone 100 and the primary and secondary headsets 200A and 200B.

The first audio processing unit 140 processes the audio data (M_data) including voice and other sound data of MP3 and DMB.

When a multichannel audio delivery mode is disabled, the first audio processing unit 140 outputs the audio data (M_data) to one headset, or to a speaker if no headset is connected. When the multichannel audio deliver mode is enabled, the first audio processing unit 140 transmits the audio data (M_data) to the primary and secondary headsets 200A and 200B and blocks output through the speaker.

The RF unit 120 converts a baseband signal to be transmitted into a radio frequency signal and converts a received radio frequency signal into a baseband signal. The RF unit 120 includes an RF transmitter for up-converting and amplifying the baseband signal to be transmitted and an RF receiver for low noise amplifying and down-converting the received radio frequency signal.

Particularly, the RF unit 120 establishes a radio communication channel to other mobile phones via a base station. Establishment and release of the communication channel can be remotely controlled by the headsets 200A and 200B.

The controller 160 controls overall operation of the mobile phone 100 and the internal elements. The controller 160 can be implemented with modem and codec functionalities.

The controller 160 controls the master wireless communication module 130 to establish communication channels with the primary and secondary headsets 200A and 200B for delivering the audio data (M_data) without interference between the communication channels. If an incoming call is received while operating in the multichannel audio delivery mode, the controller 160 hands over control for managing the call connection and releases the channel to secondary headset 200B to give sole communication to the primary headset 200A. If an incoming call is received, the controller 160 transmits a ring tone to the primary headset 200A. If a call establishment request is received from the primary headset 200A, the controller 160 pauses the delivery of the audio data (M_data) to the primary and secondary headsets 200A and 200B, and restarts the delivery of the audio data (M_data) after the call is released.

Figure 3:
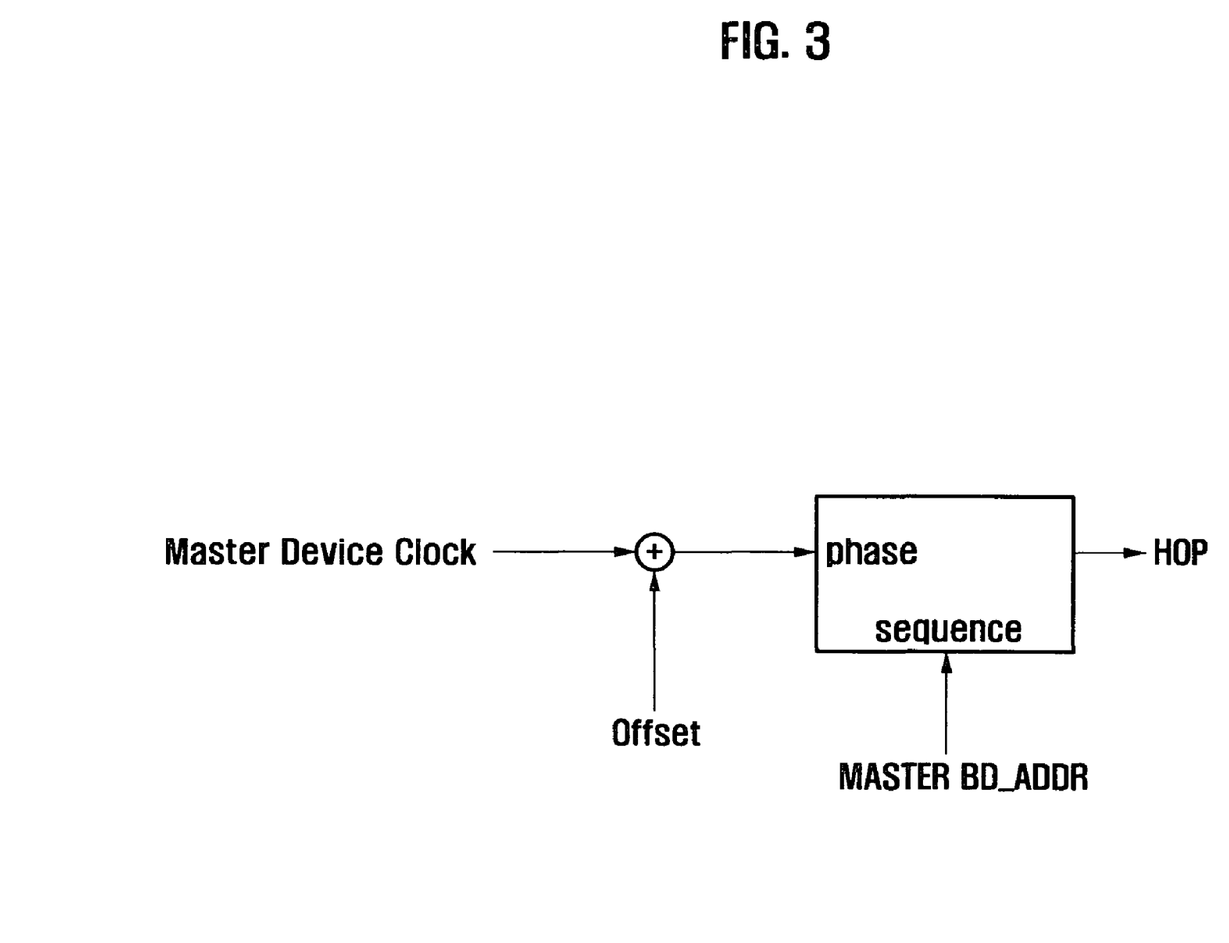
FIG. 3 is a block diagram illustrating a frequency hopping technique of the audio delivery system according to an exemplary embodiment of the present invention.

FIG. 3 is a block diagram illustrating a frequency hopping technique of the audio delivery system according to an exemplary embodiment of the present invention.

Referring to FIG. 3, the frequency hopping is performed according to a frequency hopping pattern obtained by combining, at the master wireless communication module 130, a sum of a master device clock (Native CLK) provided through a phase input terminal and a predetermined offset, and a master device address (Master BD_ADDR) provided through a circular sequence input terminal. The master wireless communication module 130 performs the frequency hopping on a piconet consisting of up to 7 slave devices, i.e. headsets. The frequency changes at a rate of 1.6 KHz, so the slave devices remain at each frequency for only 625 μs before hopping again. The master wireless communication module 130 avoids interference between the channels to the primary and secondary headsets 200A and 200B through the frequency hopping technique.

Figure 4:
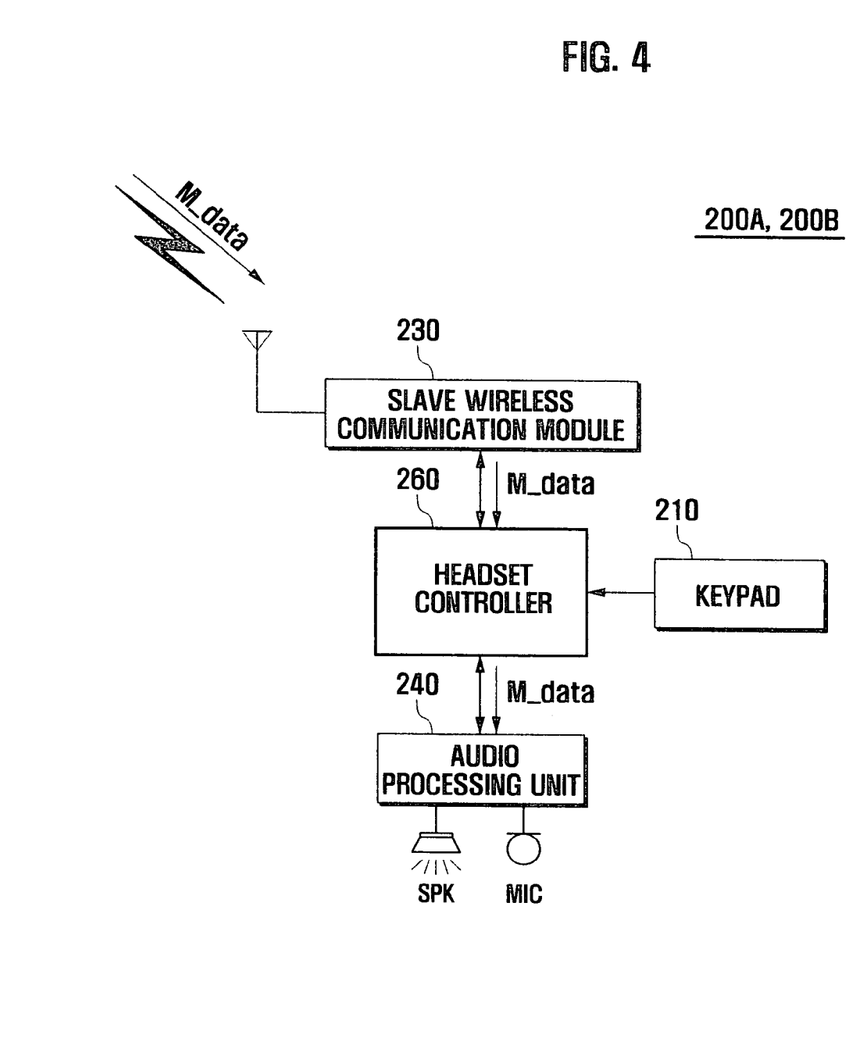
FIG. 4 is a block diagram illustrating a configuration of a headset of an audio delivery system according to an exemplary embodiment of the present invention.

FIG. 4 is a block diagram illustrating a configuration of a headset of an audio delivery system according to an exemplary embodiment of the present invention.

Referring to FIG. 4, a headset includes a slave wireless communication module 230, a second audio processing unit 240, a second keypad 210, and a headset controller 260.

The slave wireless communication module 230 is implemented with a short range wireless communication standard identical with that employed by the master wireless communication module 130 of the mobile phone 100. That is, in the aspect of the invention described herein both the slave wireless communication module 230 and master wireless communication module 130 are Bluetooth modules.

The slave wireless communication module 230 establishes a communication channel with the master wireless communication module 130 to form a piconet for receiving the audio data transmitted from the mobile phone 100. Particularly, the slave wireless communication module 230 of the primary headset 200A and the master wireless communication module 130 communicate to establish a connection oriented channel and a connectionless channel such that the primary headset 200A receives the audio data (M_data) and exchanges call control signals. That is, the connection oriented channel is used for delivering the audio data (M_data) and the connectionless channel is used for exchanging the call control signals.

Unlike the primary headset 200A, the secondary headset 200B is connected with the mobile phone 100 through only the connection oriented channel so as to receive only the audio data (M_data).

The second audio processing unit 240 processes the audio data (M_data) to be output as audible sound waves through a speaker (SPK), and processes voice data input through a microphone (MIC) during the voice communication.

The second keypad 210 is arranged on a housing of the headset for inputting control commands, e.g. call reception and rejection commands. In the case of the primary headset 200A, a call-related key input is transmitted to the mobile phone 100. The second keypad 210 is provided with a volume control key.

The headset controller 260 controls the cooperation of the slave wireless communication module 230, the second audio processing unit 240, and the second keypad 210, and processing of the audio data (M_data) received from the mobile phone 100. In the primary headset 200A, the headset controller 260 controls exchange of the control signal related to the voice communication with the mobile phone 100.

The mobile phone 100 of the present invention can include a camera and a multimedia processing unit, although these elements are not depicted in FIGS. 1 to 3.

Operation of the above-structured audio delivery system is described with reference to FIGS. 5 and 6.

The slave wireless communication module of the primary headset 200A is referred to as a primary slave wireless communication module 230A, and the slave wireless communication module of the secondary headset 200B is referred to as a secondary slave wireless communication module 230B. The primary slave wireless communication module 230A supports an Audio and Video Remote Control Profile (AVRCP) related to multimedia playback control and Hands-Free Profile (HFP) related to the voice communication control, in addition to processing the audio data (M_data) received from the master wireless communication module 130. The secondary slave wireless communication module 230 supports only processing of the audio data (M_data) received from the master wireless communication unit 130 and adjusting volume.

The master wireless communication module 130 delivers the audio data (M_data) to the primary and secondary headsets 200A and 200B using Time Division Duplexing (TDD) in a polling mode. A slot is 625 μs-long and the master wireless communication module 130 transmits 1600 slots per second. The master wireless communication polls the slave communication modules.

Figure 5:
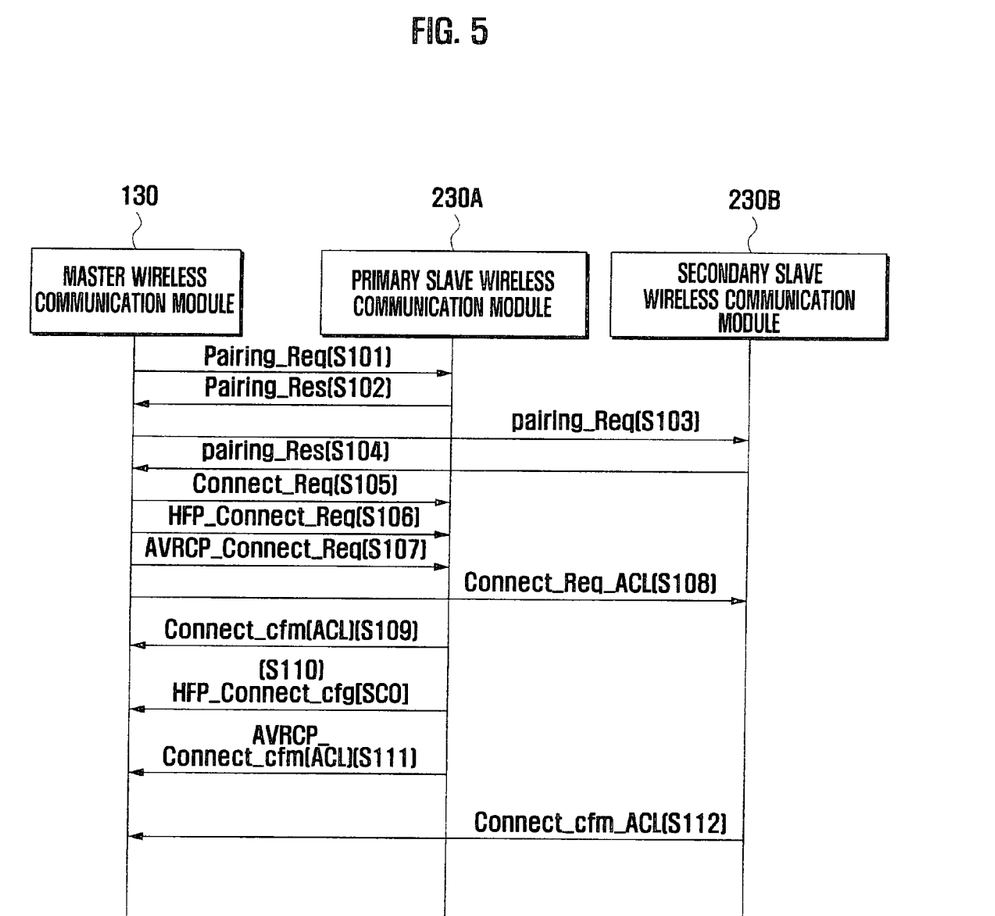
FIG. 5 is a message flow diagram illustrating message flows in an audio delivery system according to an exemplary embodiment of the present invention.

FIG. 5 is a message flow diagram illustrating message flows in an audio delivery system according to an exemplary embodiment of the present invention.

Referring to FIG. 5, the master wireless communication module 130 transmits a pairing request message (Pairing_Req) to the primary slave wireless communication module 230A of the primary headset 200A (S101). Upon receiving the Pairing_Req, the primary slave wireless communication module 230A transmits a pairing response message (Pairing_Res) to the master wireless communication module 130 (S102). The pairing is a process for authenticating the primary slave wireless communication module 230A using a link key.

The master wireless communication module 130 also transmits a Pairing_Req to the secondary slave wireless communication module 230B (S103) and receives a Pairing_Res in response to the Pairing_Req (S104).

The pairing process can be performed substantiall simultaneously with the slave wireless communication module 230A and 230B, and the headset that responds first to the Pairing_Req is selected as the primary headset. In this exemplary embodiment, it is assumed that the primary wireless communication module 230A of the primary headset 200A has responded first.

After the pairings are completed, the master wireless communication module 130 transmits a connection request message (Connect_Req) to the primary slave wireless communication module 230A for delivering audio data (M_data) (S105). Following the Connect_Req, an HFP connection request message (HFP_Connect_Req) is transmitted for the call connection control (S106), and an AVRCP connection request message (AVRCP_Connect_Req) for remote control of M_data playback (S107) is transmitted to the selected primary wireless communication module 230A.

At step S105, the master wireless communication module 130 establishes an asynchronous connectionless (ACL) link with the primary wireless communication module 230A, which is characterized by packet switching and asymmetric bandwidth. Bluetooth supports a variable packet size of 1 to 5 slots and transmits up to 721 Kbps in one direction and 57.6 Kbps in the other direction.

At step S106, the master wireless communication module 130 establishes a synchronous connection oriented (SCO) link with the primary wireless communication module 230A for HFP, which is characterized by circuit switching, periodic single slot assignment, and full duplex of 64 Kbps.

At step S107, the master wireless communication module 130 establishes an ACL link with the primary slave wireless communication module 230A for AVRCP.

Next, the master wireless communication module 130 transmits a secondary connection request message (Connect_Req_ACL) to the secondary slave wireless communication module 230B (S108).

The primary slave wireless communication module 230A transmits a connection confirmation message (Connect_cfm) to the master wireless communication module 130 so as to be a state capable of receiving the M_data through the ACL link (S109). The primary slave wireless communication module 230A transmits an HFP connection confirmation message (HFP_Connect_cfg) through the SCO link in response to the HFP_Connect_Req (S110) and an AVRCP connection confirmation message (AVRCP_Connect_cfm) through the ACL link in response to the AVRCP_Connect_Req (S111).

Finally, the secondary slave wireless communication module 230B transmits a connection confirmation message (Connect_cfm_ACL) to the master wireless communication module 130 through the ACL link for receiving M_data (S112).

As shown in FIG. 5, the master wireless communication module 130 distinguishes the primary and secondary slave wireless communication modules 230A and 230B, and establishes the ACL link and SCO link for the primary slave wireless communication module 230A and only the ACL link for the secondary slave wireless communication modules 230B.

The master wireless communication module 130 transmits M_data to the slave wireless communication modules 230A and 230B using the aforementioned frequency hopping in order to avoid interference between the slave wireless communication modules 230A and 230B.

The SCO and ACL links between the master device (mobile phone) and slave devices (headsets) are described hereinafter in more detail.

Figure 6:
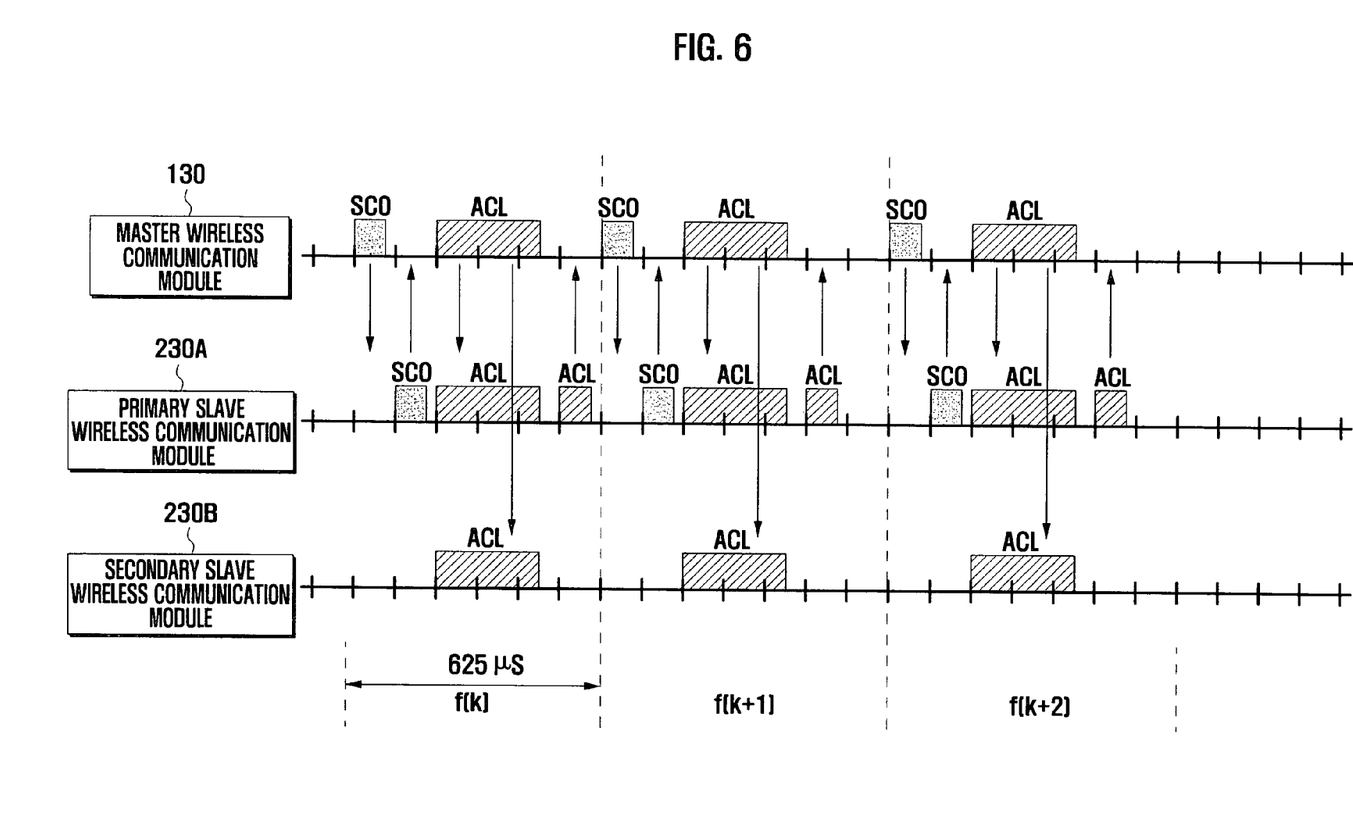
FIG. 6 is a diagram illustrating communication channels between a master device and slave devices of an audio delivery system according to an exemplary embodiment of the present invention.

FIG. 6 is a drawing illustrating communication channels between a master device and slave devices of an audio delivery system according to an exemplary embodiment of the present invention.

Referring to FIG. 6, a channel is divided into timeslots, each 625 µs in length. The master wireless communication module 130 transmits signals through SCO and ACL links.

The primary headset 200A having the primary slave wireless communication module 230A is assigned the SCO link and ACL link by the master wireless communication module 130. The primary headset 200A receives a signal from the master wireless communication module 130 through a downlink SCO channel and transmits a signal to the master wireless communication module 130 through an uplink SCO channel. The primary headset 200A also receives the audio data (M_data) from the master wireless communication module 130 through a downlink ACL channel and transmits AVRCP signals to the master wireless communication module 130 through an uplink ACL channel.

The secondary headset 200B assigned as the secondary slave wireless communication module shares only the downlink ACL channel with the primary headset 200A so as to receive the M_data through the downlink ACL channel.

An audio delivery method for a mobile phone is described hereinafter with reference to FIGS. 7a and 7b. The audio delivery method of the present invention is described with respect to a piconet including a mobile phone 100 as a master device and a plurality ("n") of headsets as slave devices. The headsets include a primary headset 200A having a primary slave wireless communication module 230A that supports processing of the audio data (M_data), key operation control (AVRCP) and call connection control (HFP), and a plurality of secondary headsets 200B each having the secondary slave wireless communication module 230B that supports processing of only the audio data (M_data).

Figure 7A:
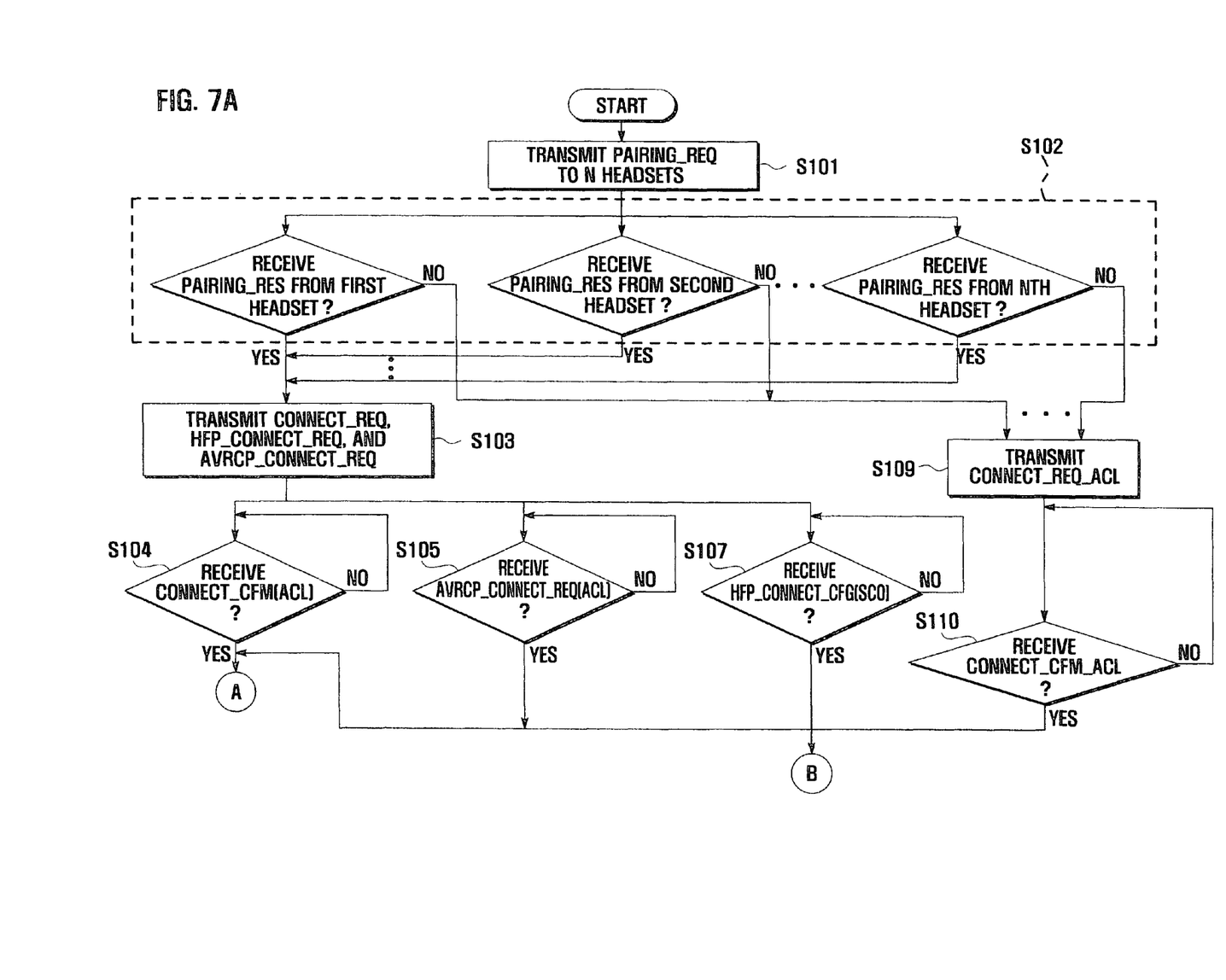
FIGS. 7a and 7b are a flowchart illustrating an audio delivery method for a mobile phone according to an exemplary embodiment of the present invention.
Figure 7B:
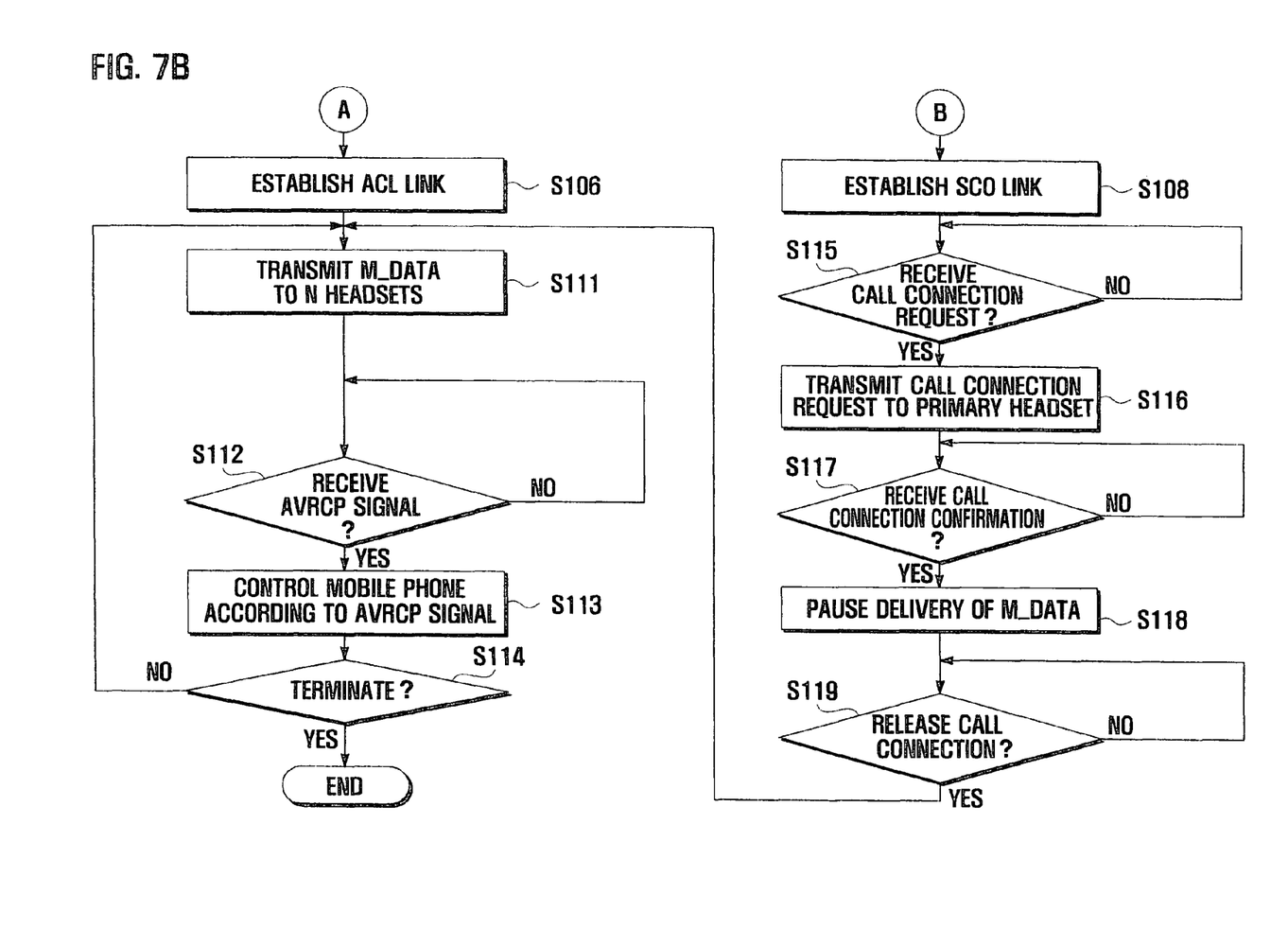

FIGS. 7a and 7b are flowcharts illustrating an audio delivery method for a mobile phone according to an embodiment of the present invention.

Referring to FIGS. 5, 7a, and 7b, the controller 160 of the mobile phone 100 transmits the pairing request message (Pairing_Req) to each of the "n" headsets (S101).

The pairing is a process for the mobile phone to authenticate the n headsets (i.e. Bluetooth devices) using respective link keys.

Next, the controller 160 receives pairing responses (Pairing_Res) from the headsets, At step S102, the controller 160 records an order of the responses from each of the headsets and records the headset from which Pairing_Res is firstly received.

When the order of the headsets has been determined, the controller 160 designates the headset firstly transmitted the Pairing_Res as the primary headset and sequentially transmits a connection request message (Connect_Req), call connection control request message (HFP_Connected_Req), and key operation control request message (AVRCP_Connect_Req) to the primary headset 200A (S103).

That is, when the primary headset 200A is determined, the controller 160 transmits control messages to the primary headset 200A for establishing communication channel. The HFP_Connected_Req and AVRCP_Connect_Req are transmitted only to the primary headset 200A.

After transmitting the control messages, the controller 160 determines whether a primary connection response message (Connect_cfm(ACL)) in response to the Connect_Req (S104) and a key operation control confirmation message (AVRCP_Connect_cfm (ACL)) in response to the AVRCP_Connect_Req (S105), is received and establishes an ACL link to the primary headset 200A after receiving the Connect_cfm (ACL) and AVRCP_Connect_cfm(ACL) message (S106). The controller 160 also determines whether a call connection control confirmation message (HFP_Connect_cfg(SCO)) is received in response to the HFP_Connect_Req (S107) and establishes an SCO link to the primary headset 200A (S108).

At step S106, the ACL link provides a channel for transmitting the M_data from the mobile phone 100 to the primary headset 200A and an AVRCP signal from the primary headset 200A to the mobile phone 100 in packet switching. The SCO link provides a channel for exchanging control signals for establishing a call connection. That is, the SCO link is established between the mobile phone 100 and the primary headset 200A when an incoming call is received.

The controller 160 also designates the remaining headsets as secondary headset 200B and transmits a secondary connection request message (Connect_Req_ACL) to the secondary headset 200B (S109).

Next, the controller 160 determines whether a secondary connection confirmation message (Connect_cfm_ACL) is received in response to the Connect_cfm_ACL (S110) and establishes ACL links to the secondary headset 200B (S106).

The ACL link provides a channel shared by the primary and secondary headsets for receiving M_data delivered from the mobile phone 100. The ACL link is used for transmitting the AVRCP signals from the primary headset 200A to the mobile phone 100. The secondary headset 200B does not receive the AVRCP_Connect_Req from the mobile phone such that the second headsets have no key operation control and do not generate the AVRCP signals.

The controller 160 transmits M_data to the primary and secondary headsets 200A and 200B (S111).

At step S111, the controller 160 delivers M_data to all of the primary and secondary headsets 200A and 200B such that the primary and secondary headsets 200A and 200B can process the M_data to output as audible sound waves. If the M_data is paused, the controller 160 can control to transmit the M_data from a start point again or from a point at which the M_data has been paused.

The controller 160 determines whether the AVRCP signal is received from the primary headset 200A (S112) and executes, if the AVRCP signal is received, a command corresponding to the AVRCP signal (S113). The AVRCP signal includes audio playback-related control signals such as a volume up/down signal, an audio file selection signal, a rewind signal, a fast forward signal, and a playback repetition signal.

While transmitting the M_data, the controller 160 determines whether a playback termination signal is received from the primary headset 200A (S114). If the playback termination signal is received, the controller 160 terminates delivery of M_data.

In the meantime, after establishing an SCO link to the primary headset (S108), the controller 160 determines whether a call connection request message is received (S115). If a call connection request message is received, the controller 160 transmits the call connection request message to the primary headset 200A (S116).

After transmitting the call connection request message, the controller 160 determines whether a call connection confirmation message is received from the primary headset 200A (S117). If a call connection confirmation message is received, the controller 160 pauses the delivery of M-data to the primary and secondary headset 200A and 200B and establishes a call connection (S118).

The controller 160 then determines whether the call connection is terminated (S119) and repeats the step S111 if the call connection is terminated.

As described above, the audio delivery system and method for a mobile phone 100 according to the present invention enable a plurality of headsets to connect to a mobile phone and share an audio channel, whereby the plurality of headsets can simultaneously receive audio data from the mobile phone.

Further, the audio delivery system and method for a mobile phone according to the present invention designate one of the plurality of headsets sharing an audio channel as a primary headset and hands over a call control and audio data playback control to the primary headset, thereby sharing audio data while maintaining a wireless remote call control convenience.

Further, the audio delivery system and method for a mobile phone according to the present invention enable a volume level of audio data shared through multiple wireless headsets to be adjusted at individual headsets, resulting in improvement of user convenience.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An audio delivery method for a short range wireless communication network including a master device and a plurality of slave devices, comprising the steps of:
    selecting, at the master device, one of the slave devices as a primary slave device;
    assigning a master control comprising at least one of an audio data playback control for controlling playback of the audio data and a call control of the master device for controlling a call connection with another telephony device to the primary slave device;
    establishing a communication channel between the master and the slave devices;
    delivering audio data to the slave devices through the communication channel;
    receiving an audio data change request signal from the primary slave device;
    changing the audio data to another audio data; and
    transmitting the changed audio data to each of the plurality of slave devices;
    wherein the step of establishing a communication channel between the master and the slave devices comprises the steps of:
    establishing a synchronous connection oriented link and an asynchronous connectionless link between the master device and the primary slave device; and
    establishing asynchronous connectionless links between the master device and slave devices except the primary slave device.

2. The audio delivery method of claim 1, wherein the step of selecting a primary slave device comprises the steps of:
    transmitting a pairing request to each of the slave devices;
    receiving a pairing response from the slave devices; and
    selecting the slave device from which the pairing response is first received.

3. The audio delivery method of claim 1, further comprising the steps of:
    receiving a call connection request from another telephony device;
    pausing the delivery of the audio data to the slave devices;
    handing over the call control to the primary slave device; and
    restarting the delivery of the audio data to the slave devices after releasing the call connection.

4. The audio delivery method of claim 1, wherein the asynchronous connectionless link is used for transmitting the audio data from the master device to the slave devices and transmitting audio data playback control signals from the primary slave device to the master device.

5. The audio delivery method of claim 1, wherein the synchronous connection oriented link is used for transmitting call control signals from the primary slave device to the master device.

6. The audio delivery method of claim 1, wherein the audio data is transmitted from the master device to the slave devices according to a frequency hopping pattern.

7. An audio delivery system comprising:
a plurality of slave devices for receiving identical audio data and outputting the audio data as audible sound waves comprising a primary slave device; and
a master device for:
selecting one of the plurality of slave devices as the primary slave device;
assigning a master control comprising at least one of an audio data playback control for controlling playback of the audio data and a call control for controlling a call connection with another telephony device to the primary slave device;
establishing a synchronous connection oriented link and an asynchronous connectionless link between the master device and the primary slave device;
establishing asynchronous connectionless links between the master device and slave devices except the primary slave device;
delivering the audio data to the slave devices through the communication channels;
receiving an audio data change request signal from the primary slave device;
changing the audio data to another audio data; and
transmitting the changed audio data to each of the plurality of slave devices.

8. The audio delivery system of claim 7, wherein the master device comprises:
a short range wireless communication module for establishing the communication channel to the slave devices;
a memory for storing the audio data;
a keypad for generating key input signal for transmitting the audio data;
a radio frequency unit for processing cellular communication signals to and from another wireless telephony device; and
a controller for controlling operations among the short range wireless communication module, the memory, the keypad, and the radio frequency unit, forming a short range wireless communication network with the slave devices, and handing out a control of the master device to one of the slave devices.

9. The audio delivery system of claim 7, wherein each slave device comprises:
a short range wireless communication module for establishing the communication channel with the master device;
an audio processing unit for processing the audio data received from the master device to output as audible sound wave;
a keypad for generating audio playback control signal; and
a controller for controlling operation among the short range wireless communication module, the audio processing unit, and the keypad, and controlling playback of the audio data.

10. The audio delivery system of claim 7, wherein, responsive to a call connection request is received from another telephony device, the controller pauses the delivery of the audio data, and hands over the call control to the primary slave device.

11. The audio delivery system of claim 7, wherein the asynchronous connectionless link is used for transmitting the audio data from the master device to the slave devices and transmitting audio data playback control signals from the primary slave device to the master device.

12. The audio delivery system of claim 7, wherein the synchronous connection oriented link is used for transmitting call control signals from the primary slave device to the master device.

13. The method as recited in claim 6, wherein the hopping pattern is determined by combining a sum of a master device clock and a predetermined offset and a master device address.

14. The system of claim 10 wherein the controller restarts the delivery of the audio data after releasing the call connection.

15. The audio delivery method of claim 1, wherein the plurality of slave devices comprise a plurality of headsets, and wherein a volume level of audio data shared through multiple wireless headsets is adjusted at an individual headset.

16. The system of claim 7, wherein the plurality of slave devices comprise a plurality of headsets, and wherein a volume level of audio data shared through multiple wireless headsets is adjusted at an individual headset.

* * * * *